United States Patent [19]

Rakar et al.

[11] Patent Number: 5,139,359
[45] Date of Patent: Aug. 18, 1992

[54] VIBRATOR-STEAMSHIP TRUCK CONTAINER CLAMP ASSEMBLY

[75] Inventors: Gene L. Rakar; Paul R. Giles; Lowell D. Yates; Thomas A. Franzone; Charles L. Lockhart, all of Mt. Pleasant, S.C.

[73] Assignee: Amoco Corporation, Chicago, Ill.

[21] Appl. No.: 358,710

[22] Filed: May 30, 1989

[51] Int. Cl.⁵ .................................. F16B 35/04
[52] U.S. Cl. ........................... 403/24; 403/167; 403/247; 403/256; 403/323; 403/324; 403/408.1; 410/77; 410/82; 411/401; 414/375
[58] Field of Search ............... 403/24, 348, 25, 49, 403/167–168, 210, 247, 256, 257, 323–324, 408.1; 414/375, 415, 786; 248/222.3; 211/191, 192; 410/77, 82

[56] References Cited

U.S. PATENT DOCUMENTS

| | | | |
|---|---|---|---|
| 1,282,538 | 10/1918 | Cadwallader, Jr. | 411/401 |
| 1,661,868 | 3/1928 | Armstrong et al. | 403/362 |
| 2,099,116 | 11/1937 | Kalmbach | 248/222.3 X |
| 3,032,281 | 5/1962 | Wexell | 403/348 X |
| 3,420,480 | 1/1969 | Matson | 414/375 X |
| 3,463,431 | 8/1969 | Matson | 414/375 X |
| 3,593,387 | 7/1971 | Georgi | 410/82 |
| 3,872,555 | 3/1975 | Link et al. | 403/24 X |
| 3,986,318 | 10/1976 | McConnell | 403/408.1 X |
| 4,131,204 | 12/1978 | Jacoby et al. | 211/192 |
| 4,139,228 | 2/1979 | Varadi | 410/82 X |
| 4,394,101 | 7/1983 | Richer | 403/248 X |
| 4,496,061 | 1/1985 | Highsmith | 211/192 X |
| 4,648,764 | 3/1987 | Pavlick | 410/82 X |
| 4,784,552 | 11/1988 | Rebentisch | 403/348 X |
| 4,830,531 | 5/1989 | Condit et al. | 403/348 |
| 4,834,572 | 5/1989 | Harrington et al. | 403/348 X |

FOREIGN PATENT DOCUMENTS 335673  10/1089  European Pat. Off. ............ 403/348

Primary Examiner—Randolph A. Reese
Assistant Examiner—Heather Chun
Attorney, Agent, or Firm—Gunar J. Blumberg; William H. Magidson; Robert J. Wagner

[57] ABSTRACT

There is provided a clamp-type apparatus for connecting a first object, such as a vibratory mechanism, to a second object that is a box-type vessel having at least one slot in a side near a corner, such as a steamship truck container, which apparatus comprises: (a) a first plate having a first aperture and at least one second aperture, the at least one second aperture being used to attach the first object to the first side of the first plate; (b) a bolt-type fastener for attaching the second object to the second side of the first plate, the fastener passing through the first aperture and being capable of rotating about its axis; (c) a rod for rotating the fastener about its axis; and (d) a small second plate for preventing movement of the apparatus relative to the second object, the second plate being perpendicular to and attached to the first plate. There are also provided a method for connecting a vibratory mechanism to a steamship truck container and a method for vibrating a steamship truck container.

11 Claims, 2 Drawing Sheets

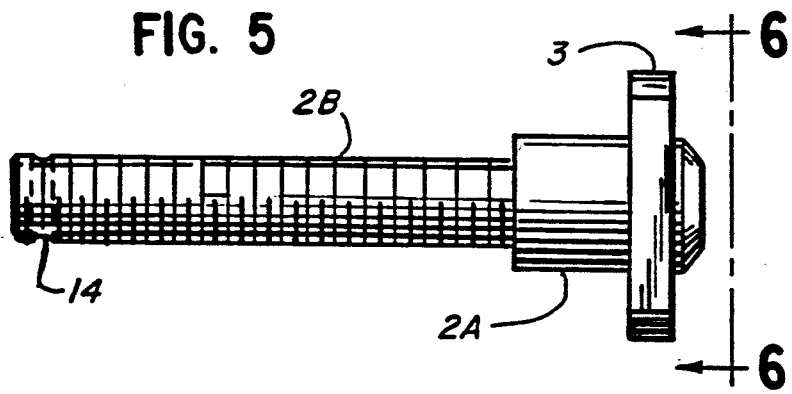
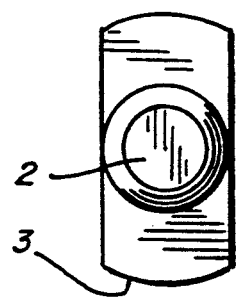
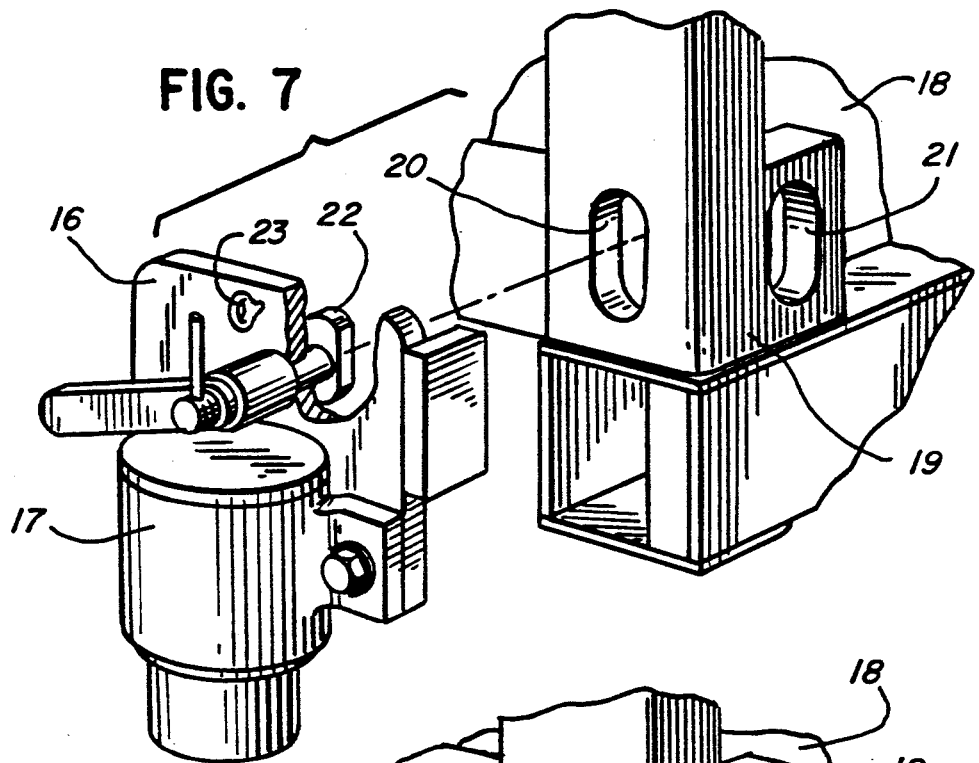
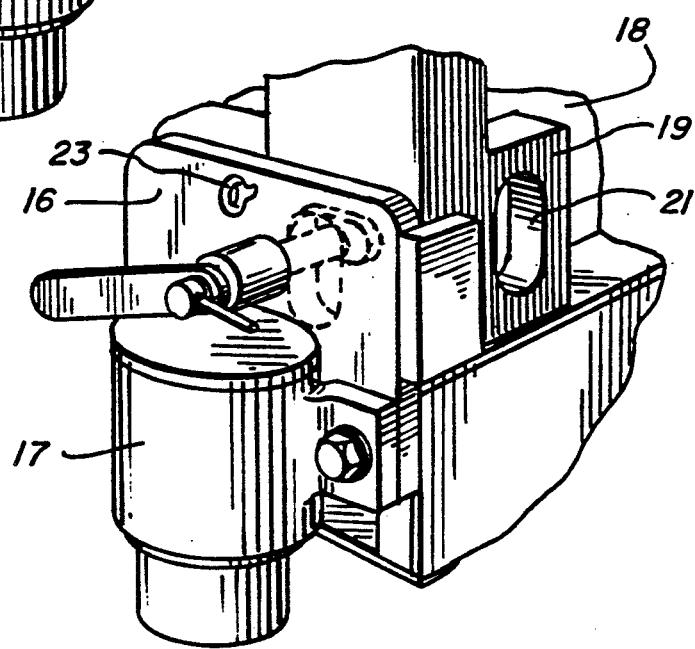

VIBRATOR-STEAMSHIP TRUCK CONTAINER CLAMP ASSEMBLY

BACKGROUND OF THE INVENTION

1. Field of the Invention

This invention relates to a clamping device for clamping together a vibratory mechanism and a bulk container. More particularly, this invention relates to a clamping device for securely connecting a vibratory mechanism to a steamship truck container.

2. Description of the Prior Art

Although not directed to a vibrator clamp, two U.S. patents directed to clamping devices are of interest.

In U.S. Pat. No. 1,661,868, Armstrong, et al, disclose a clamping device for clamping together two movable telescopic members, wherein one of the members, the first member, extends through a part having an aperture into the other member, the second member, into which it telescopes, the first member being securely held in position with the second member by a locking member or bolt, the locking member passing through the aperture and pressing the first member against the inside wall of the second member when the locking member is turned in the proper direction by means of an operating tool or wrench that is permanently attached to the locking member or bolt.

In U.S. Pat. No. 2,099,116, Kalmbach discloses a clamping mechanism for use in hoisting a heavy or bulky article, such as a crossbar frame containing groups of correlated devices and pieces of telephone apparatus, which clamping mechanism does not invade appreciably the interior of the crossbar frame. This clamping device comprises a first member, a bolt, having an elongated overhanging head formed to pass through an elongated slot in an object to which the clamping device is to be attached when in a first position relative to the slot and not to pass through the slot when rotated into a second position, a support member movably mounted on the body of the first member and provided with a lug formed to enter the slot from the same side of the object only beside the body of the first member and to stand beside the head of the first member when in the second position of the head to prevent the first member from rotating from its second position and to prevent the support member from rotating, an aperture on the support member for a hoisting hook or other attaching device, and an adjustable means to force the support member to move on the first member toward the head of the first member to clamp the object between the head and support member.

Various products in the form of a powder or small granules, such as talcum powder or polystyrene pellets, are shipped via steamships in bulk containers. The receiver of the bulk container empties the container. The procedure for emptying the bulk container would be facilitated, if the container were being vibrated or shaken. Vibration of the bulk container results in complete removal of the contents from the container. However, steamship bulk containers do not have a standard design for the side and floor areas and do not have an area of flat steel on the bottom to hold the conventional clamp, which is designed to hold a vibrator and lock onto a flat steel plate.

The clamping devices described in the above-discussed patents, as well as other conventional clamps, are inadequate for connecting a vibratory mechanism to a steamship truck container. They are not capable of being adapted for connecting the vibratory mechanism to the bulk container.

Now there has been developed a clamping device that is suitable for attaching a vibratory mechanism to a steamship truck container.

SUMMARY OF THE INVENTION

There is provided a clamp-type apparatus for connecting a first object to a second object, wherein said second object is a box-type vessel having at least one slot in a side near a corner, said slot being able to receive and have pass therethrough a rectangular-shaped article and being at a sufficient distance from said corner to enable said clamp-type apparatus to be used with said second object. This clamp-type apparatus comprises: (a) a first plate having a first aperture and at least one second aperture, said at least one second aperture being used to fasten said first object to a first side of said first plate; (b) a fastening means for fastening the second object to a second side of said first plate, said first side and said second side being parallel to and opposite one another, said fastening means passing through said first aperture and being capable of rotation about its longitudinal axis; (c), a means for rotating said fastening means about its longitudinal axis; and (d) a restraining means for preventing movement of the clamp-type apparatus relative to the second object. This clamp-type apparatus is referred to hereinafter also as "apparatus". Suitably, the fastening means is a threaded nut and bolt assembly, wherein the bolt is threaded on one end and has an elongated expanded section at the other, which section ends in a plate-type head which is adapted for insertion through a slot in the side of the second object. The head of the bolt of the nut and bolt assembly is used to hold the second object against the second side of the first plate when the bolt is turned or rotated through an angle of 90°, so that the turned head cannot be withdrawn from the second object through the slot. The restraining means comprises a small second plate which is perpendicular to the first plate, is fastened to an edge of the first plate, and extends outwardly from the first plate toward the second object. The small second plate, which is perpendicular to the first plate and to the head of the bolt, is spaced a distance from the axis of the bolt that is sufficient to place the head in the slot and the small second plate against a side of the second object perpendicular to the side having the slot, thus preventing the first plate and apparatus from moving relative to the second object. In this way, the second object is held securely to the clamping apparatus.

Suitably, the first object is a vibrator and the second object is a bulk container, such as a steamship truck container.

Accordingly, this clamp-type apparatus can be used conveniently to fasten a vibratory mechanism to the corner device found on a bulk steamship truck container at each corner of the container, which corner device is used to stack one container on top of another.

There are also provided a method for connecting a vibratory mechanism to a steamship truck container and a method for vibrating a steamship truck container, each of which methods comprises using the clamping device of the present invention.

BRIEF DESCRIPTION OF THE DRAWINGS

Eight figures accompany this specification and are directed to the apparatus of the present invention and- /or the use of the apparatus when the apparatus is used to clamp a vibratory mechanism to a steamship container.

FIG. 5 depicts the locking bolt of the clamp-type apparatus, when viewing its length.

FIG. 6 shows a plan view of the head of the locking bolt, when looking on line 6—6 in FIG. 5.

FIG. 7 is a perspective view showing the clamp-type apparatus of the present invention (fastened to a vibrator) and a corner device of a steamship truck container prior to the joining of the clamp-type apparatus to the corner device.

FIG. 8 presents a perspective view of the clamp-type apparatus, the vibrator, and the corner device of the steamship truck container of FIG. 7 after the clamp-type apparatus and vibrator have been joined to the corner device.

DETAILED DESCRIPTION AND PREFERRED EMBODIMENT

Figure 1:
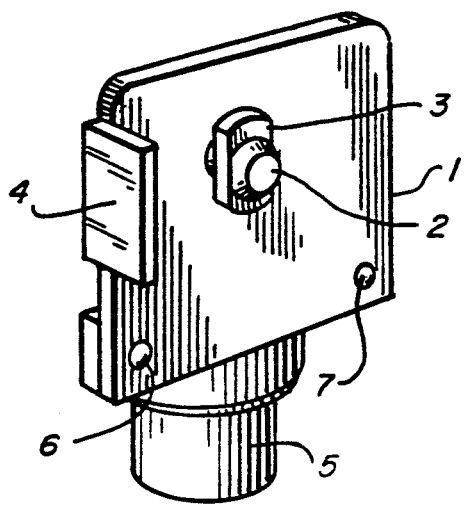
FIG. 1 provides a three-dimensional view of a preferred embodiment of the clamp-type apparatus of the present invention, when one is looking toward the container side of the clamp-type apparatus.

Various particulate materials are shipped in bulk steamship truck containers. These materials must be unloaded from such containers. The unloading can be facilitated by shaking or vibrating the container. However, up until now, there has not been a suitable means for clamping or attaching a vibratory mechanism or vibrator to such a large bulk container. Vibrator clamps that are supplied currently on the market are not capable of being attached to these bulk containers, since such containers do not have a uniform design of the side and floor areas. Generally, there is no area of flat steel on the bottom of the container to hold the conventional clamp. On the other hand, each container does have a standard corner device on all four corners, top and bottom, such corner device being used to stack the containers one on top of another.

There has now been developed a clamp which can be inserted into the side of the rear corner device with a locking mechanism built especially for this purpose. The rear corner device of the bulk container comprises a flat area having a slot. The new clamp-type apparatus includes a bolt head that is adapted to be inserted into and through one of these slots. After being inserted through a slot, the bolt is rotated on its axis through an angle that is sufficient to move the head to a position that will prevent the head from being withdrawn from the corner device through the slot.

According to the present invention, there is provided a clamp-type apparatus that is and used to connect a first object to a second object, wherein said second object is a box-type vessel having at least one slot in a side near a corner, said slot being of a size that is sufficient to receive and have pass therethrough a rectangular-shaped article and being at a sufficient distance from said corner to enable said apparatus to be used with said second object, which apparatus comprises: (a) a first plate having a first aperture and at least one second aperture, said at least one second aperture being used to fasten said first object to a first side of said first plate; (b) a fastening means for fastening said second object to a second side of said first plate, said first side and said second side of said first plate being parallel to and opposite one another, said fastening means comprising a threaded nut and bolt assembly, the bolt of said assembly being threaded on one end and having an elongated expanded section at the other, said section ending in a rectangular plate-type head, and said bolt passing through said first aperture so that said head is on the second side of said first plate and parallel to said first plate and the nut of said assembly is on the first side of said first plate, said head being suitable for insertion through said slot in the side of said second object; (c) a means for rotating said fastening means about its longitudinal axis, said means for rotating being joined to said assembly; and (d) a restraining means for preventing movement of said apparatus relative to said second object, said restraining means comprising a small second plate which is perpendicular to said first plate, is joined to an edge of said first plate, and extends outwardly from said first plate toward said second object.

More particularly, there is provided a clamp-type apparatus that is used to connect a vibratory mechanism to a steamship truck container, which apparatus comprises: (a) a main plate having a first aperture and at least one second aperture, said at least one second aperture being used to fasten said vibratory mechanism to a first side of said main plate; (b) a fastening means for fastening said container to a second side of said main plate, said first side and said second side of said main plate being parallel to opposite one another, said fastening means comprising a threaded nut and bolt assembly, the bolt of said assembly being threaded on one end and having an elongated expanded section at the other end, said section ending in a rectangular plate-type head, and said bolt passing through said first aperture so that said head is on the second side of said main plate and parallel to said main plate and the nut of said assembly is on the first side of said main plate, said head being suitable for insertion through a slot in the side of said container; (c) a means for rotating said bolt about its axis, said means for rotating being joined to said bolt at its threaded end; and (d) a restraining means for preventing movement of said apparatus relative to said container, said restraining means comprising a small plate which is perpendicular to said main plate, is joined to an edge of said main plate, and extends outwardly from said main plate toward said container.

There is provided also a method for vibrating a steamship truck container, which method comprises using the above clamp-type apparatus to attach a vibratory mechanism to the steamship truck container and causing said vibratory mechanism to vibrate.

The apparatus of the present invention can be used conveniently and easily to facilitate the vibrating of a large container of particulate material, enabling the operator of the apparatus to completely empty the contents from the container. The apparatus is placed next to the container and the plate-type head of the bolt is introduced into and passed through the slot in the corner device of the container, the small plate of the apparatus slipping along the perpendicular side of the corner device, i.e., the side that is perpendicular to the side through which the bolt head is passed. When the bolt head is completely inside the corner device, the bolt is rotated on its axis so that the length of the head is perpendicular to the length of the slot through which it passed, preventing the bolt head from being passed or withdrawn through the slot. Since the small plate on the side of the apparatus rests against the perpendicular side of the corner device of the container, the apparatus can't rotate relative to the container. The apparatus is locked to the container. When the vibrator is turned on, the clamped or joined together vibrator, apparatus, and container will all vibrate.

Accordingly, there is provided a method for connecting a vibratory mechanism to a steamship truck container, which method comprises fastening said vibratory mechanism and said container to the apparatus of the present invention.

In addition, as mentioned hereinabove, there is provided a method for vibrating a steamship truck container, which method comprises fastening a vibratory mechanism and said container to the apparatus of the present invention and causing said vibratory mechanism to vibrate.

A preferred embodiment of the clamp-type apparatus of the present invention is described hereinafter in order to facilitate an understanding of the present invention. It is presented for the purpose of illustration only and is not intended to limit the scope of the present invention.

This preferred embodiment of the clamp-type apparatus of the present invention is depicted in FIGS. 1, 2, 3, and 4. A three-dimensional view of this embodiment, when one is looking toward the container side of the apparatus, is shown in FIG. 1. A three-dimensional view of this embodiment, when one is looking toward the vibrator side of the apparatus, is presented in FIG. 2. An end view of the apparatus, when one is looking toward the right edge of the apparatus which is represented in FIG. 1, i.e., the edge which does not hold the small side plate, is pictured in FIG. 3. In each of these figures, a vibrator is shown fastened to the apparatus in order to facilitate an understanding of the apparatus and its use. The vibrator is not a part of the invention. Any vibratory mechanism that will provide sufficient vibration to an export bulk container and is adaptable to being fastened to the clamp-type apparatus of the present invention is suitable.

According to FIGS. 1, 2, 3, and 4, this embodiment of the present invention comprises a main plate 1, a locking bolt 2 with a rectangular head 3, small side plate 4, optional socket wrench 10, and guide rod 9, joined together in the manner depicted. The apparatus is connected to vibrator 5 by bolt assemblies 6 and 7.

Figure 4:
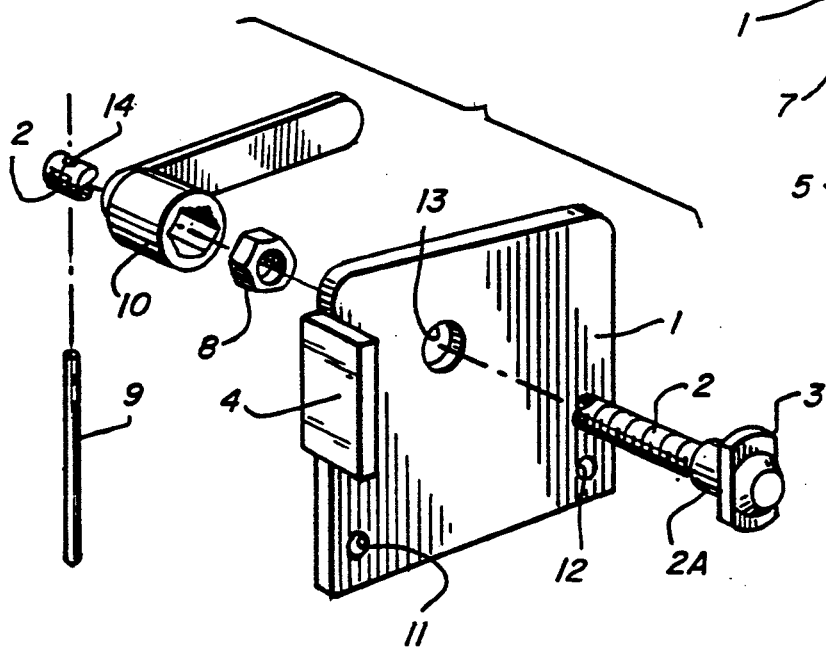
FIG. 4 shows an exploded assembly of a preferred embodiment of the clamp-type apparatus of the present invention.

An exploded assembly of the apparatus is shown in FIG. 4. The elongated, expanded section of bolt 2 is identified by 2A, while the holes needed to fasten the vibrator to the plate 1 are represented by holes 11 and 12. Hexagonal nut 8 is the nut for bolt 2. Bolt 2 extends through hole 13 in plate 1. Guide rod 9 fits into hole 14 of bolt 2.

The socket wrench 10 conveniently fits over hexagonal nut 8 and is held in place by guide rod 9. Please note that socket wrench 10 is optional. Any suitable wrench can be used and is needed only to tighten the hexagonal nut 8 when the nut is loosened as a result of the vibratory motion. Consequently, the wrench need not be an essential element of the apparatus of the present invention. However, if the wrench is part of the apparatus, such as a socket wrench held in place on the nut, the wrench is available conveniently when needed. Rod 9 not only holds the socket wrench 10 in place, but its main function is to rotate bolt 2 when the container is being secured to the clamp. In addition, rod 9 can be used to indicate the position of bolt head 3, since rod 9 is parallel to the longer side (length) of rectangular head 3.

In this preferred embodiment of the clamp-type apparatus of the present invention, plate 1 is 0.75-inch thick, 10 inches wide, and 9.25 inches high. Although the corners at the top are shown as being rounded in this embodiment, the rounded corners are not necessary. Plate 1 has two 0.75-inch holes, holes 11 and 12, near the bottom. These two holes are 8 inches apart and are 1.5 inches from the bottom of the plate. Each of these two holes is located 1 inch from one of the sides of the plate. A third hole, hole 13, is located 3 inches from the top of the plate 1, 4 inches from the left edge of the plate, and 6 inches from the right edge of the plate, when looking toward the container side of the plate. Hole 13 is about 1.03 inches in diameter.

Figure 2:
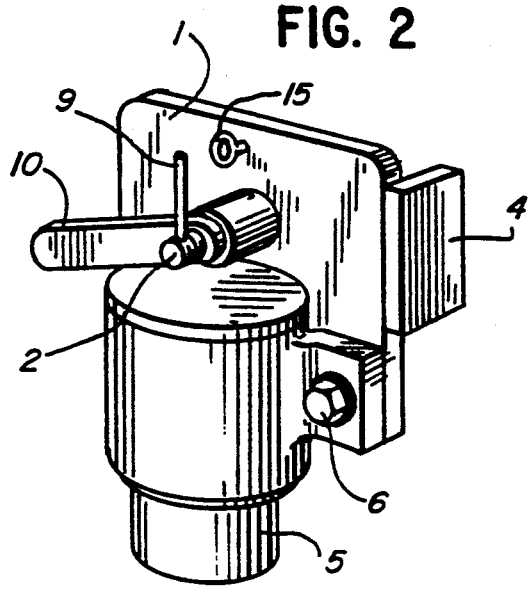
FIG. 2 represents a three-dimensional view of the same preferred embodiment, when one is looking toward the vibrator side of the clamp-type apparatus.
Figure 3:
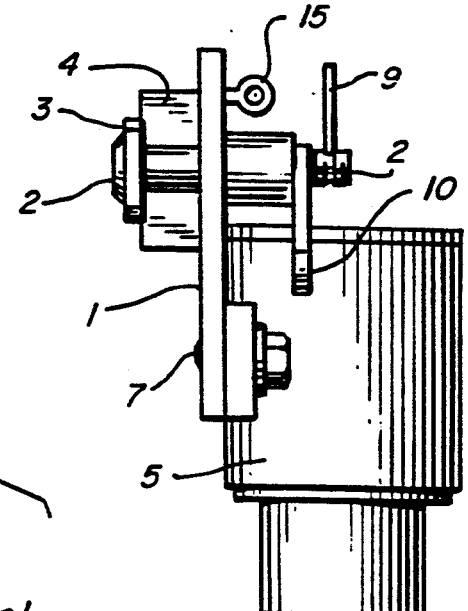
FIG. 3 provides an end view of the clamp-type apparatus, when one is looking toward the right side of the clamp-type apparatus that is shown in FIG. 1.

An eye-hook 15 is optional and can be used to facilitate the moving of the apparatus from one location to another. Eye-hook 15 is depicted in FIGS. 2 and 3.

FIG. 5 presents a side view of bolt 2, while FIG. 6 provides a plan view of head 3 on line 6—6 of FIG. 5. Bolt 2 is 1 inch in diameter and 7 inches long. Expanded section 2A of bolt 2 is 1.75 inches in diameter and 1.5 inches long. Plate-type head 3 of bolt 2 is shaped as shown in FIG. 6. The diameter of the rounded part is 2.562 inches, while the distance between the flat and parallel sides is 1.75 inches. The threaded end 2B is 5 inches in length and has 1"-8 UNC threads.

The hexagonal nut 8 of the apparatus is a 1"-8 UNC hexagonal nut.

The side plate 4 is 4 inches long, 1.75 inches wide, and 0.25 inch thick. It is located 3.75 inches from the bottom of plate 1 and is attached to plate 1 in a manner that will have a 0.5-inch strip of plate 4 abutting the edge of plate 1.

The wrench-type means 10 is made up of a 1 ⅛-inch × ¾-inch drive socket welded to a 16-inch flat bar that is 2 inches wide and 0.25 inch thick. The bar is rounded on the ends and the socket is centered at the one end of the bar so that the center of the socket and the center of the semi-circle of the end are positioned on the same axis one above the other. A 1.25-inch hole is bored through the flat bar and socket after the welding of the socket to the bar has been completed.

In perspective views FIGS. 7 and 8, export truck container 18 is shown with corner device 19, which has slots 20 and 21. In addition, vibrator 17 is shown joined to clamp-type apparatus 16, which has bolt head 22 and an eye-hook 23, which can be used conveniently to handle the apparatus of the present invention when moving it from one position to another.

As is demonstrated in the preceding drawings and discussion, the clamp-type apparatus of the present invention can be used conveniently and suitably for connecting a vibratory mechanism to an export truck container.

What is claimed is:

1. A clamp-type apparatus containing a rotatable fastening means that is used to connect a first object to a second object, wherein said second object is a box-type vessel having at least one slot in a side near a corner, said slot being of a size that is sufficient to receive and have pass therethrough a rectangular-shaped article and being at a distance from said corner that will permit said apparatus to be used with said second object, which apparatus comprises:

(a) a first plate having a first aperture and at least one second aperture, said at least one second aperture being used to fasten said first object to a first side of said first plate;

(b) a rotatable fastening means for fastening said second object to a second side of said first plate, said fastening means comprising a rotatable threaded nut and bolt assembly, the bolt of said assembly being threaded on one end and having an elongated expanded section at the other, said section ending in a rectangular pate-type head, said head being said rectangular-shaped article, and said bolt passing through said first aperture so that said head is on the second side of said first plate and parallel to said second side of said first plate and the nut of said assembly is on the first side of said first plate, said head being suitable for insertion through said slot in the side of said second object, said rotatable fastening means and said plate connecting said first object to said second object;

(c) a means for rotating said bolt about its longitudinal axis, said means for rotating being joined to said bolt; and (d) a restraining means for preventing rotational movement of said apparatus relative to said second object, said restraining means comprising a small second plate which is perpendicular to said first plate, is joined to an edge of said first plate, and extends outwardly from said first plate toward said second object.

2. A clamp-type apparatus containing a rotatable fastening means that is used to connect a vibratory mechanism to a steamship truck container, which apparatus comprises:

(a) a main plate having a first aperture and at least one second aperture, said at least one second aperture being used to fasten said vibratory mechanism to a first side of said main plate;

(b) a rotatable fastening means for fastening said container to a second side of said main plate, said fastening means comprising a threaded nut and bolt assembly, the bolt of said assembly being threaded on one end and having an elongated expanded section at the other end, said section ending in a rectangular plate-type head, and said bolt passing through said first aperture so that said head is on the second side of said main plate and parallel to said second side of said main plate and the nut of said assembly is on the first side of said main plate, said head being suitable for insertion through a slot in the side of said container, said rotatable fastening means and said plate connecting said vibratory mechanism to said container;

(c) a means for rotating said bolt about its longitudinal axis, said means for rotating being joined to said bolt at its threaded end; and (d) a restraining means for preventing rotational movement of said apparatus relative to said container, said restraining means comprising a small plate which is perpendicular to said main plate, is joined to an edge of said main plate, and extends outwardly from said main plate toward said container.

3. The apparatus of claim 2, wherein said apparatus comprises further a wrench-type means for turning and tightening said nut on said bolt, said wrench-type means being joined to said nut.

4. The apparatus of claim 2, wherein there are two second apertures.

5. The apparatus of claim 4, wherein said apparatus comprises further a wrench-type means for turning and tightening said nut on said bolt, said wrench-type means being joined to said nut.

6. The apparatus of claim 5, wherein (a) said nut and bolt assembly comprises a bolt that is 1 inch in diameter and 7 inches long, has an expanded section that is 1.75 inches in diameter and 1.5 inches long, has a plate-type head having a distance between the flat and parallel sides of 1.75 inches, and has a threaded end that is 5 inches in length with 1"-8 UNC threads and a hexagonal nut having 1"-8 UNC threads; (b) said main plate has a thickness of 0.75 inch, a height of 9.25 inches, and a width of 10 inches; (c) said first aperture is about 1 inch in diameter, and each of said second apertures is about 0.75 inch in diameter; (d) said first aperture is located 3 inches from the top of said main plate, 4 inches from the left edge of said main plate, and 6 inches from the right edge of said main plate, when looking toward the container side of said main plate; (e) said second apertures are located 8 inches apart and 1.5 inches from the bottom of said main pate, each of said second apertures being located at a distance of about 1 inch from an edge of said main plate; (f) said small plate is 0.25 inch in thickness, 1.75 inches in width, and 4 inches in length and is located 3.75 inches from the bottom of said main plate and is attached to said main plate in a manner that will provide a 0.5-inch strip of said small plate abutting the edge of said main plate; and (g) said means for rotating comprises a rod that is 0.25 inch in diameter and 6 inches in length, said rod being inserted in and fastened to a hole in the threaded end of said bolt.

7. The apparatus of claim 4, wherein (a) said nut and bolt assembly comprises a bolt that is 1 inch in diameter and 7 inches long, has an expanded section that is 1.75 inches in diameter and 1.5 inches long, has a plate-type head having a distance between the flat and parallel sides of 1.75 inches, and has a threaded end that is 5 inches in length with 1"-8 UNC threads and a hexagonal nut having 1"-8 UNC threads; (b) said main plate has a thickness of 0.75 inch, a height of 9.25 inches, and a width of 10 inches; (c) said first aperture is about 1 inch in diameter, and each of said second apertures is about 0.75 inch in diameter; (d) said first aperture is located 3 inches from the top of said main plate, 6 inches from the left edge of said main plate, and 6 inches from the right edge of said main plate, when looking toward the container side of said main plate; (e) said second apertures are located 8 inches apart and 1.5 inches from the bottom of said main plate, each of said second apertures being located at a distance of about 1 inch from an edge of said main plate; (f) said small plate is 0.25 inch in thickness, 1.75 inches in width, and 4 inches in length and is located 3.75 inches from the bottom of said main plate and is attached to said main plate in a manner that will provide a 0.5-inch strip of said small plate abutting the edge of said main plate; and (g) said means for rotating comprises a rod that is 0.25 inch in diameter and 6 inches in length, said rod being inserted in and fastened to a hole in the threaded end of said bolt.

8. A method for connecting a vibratory mechanism to a steamship truck container having at least one rear corner device comprising a flat surface with a slot, said connecting being accomplished by means of a clamp-type apparatus containing a rotatable fastening means comprising:

(a) a main plate having a first aperture, at least one second aperture, a first side, and a second side;

(b) a rotatable fastening means comprising a threaded nut and bolt assembly, the bolt of said assembly being threaded on one end and having an elongated expanded section at the other end, said second ending in a rectangular plate-type head, and said bolt passing through said first aperture so that said head is on the second side of said main plate and parallel to said second side of said main plate and the nut of said assembly is on the first side of said main plate, said head being suitable for insertion through said slot in said corner device of said container, said rotatable fastening means and said plate connecting said vibratory mechanism to said container;

(c) a means for rotating said bolt about its longitudinal axis, said means for rotating being joined to said bolt at its threaded end; and (d) a restraining means for preventing rotational movement of said apparatus relative to said container when said apparatus is connected to said container, said restraining means comprising a small plate which is perpendicular to said main plate, is joined to an edge of said main plate, and extends outwardly from said main plate toward the container to which said apparatus is connected;

which method comprises fastening said vibratory mechanism to said first said of said main plate by means of said at least one second aperture and fastening said container to said second side of said main plate by passing said head of said bolt through said slot in said corner device of said container and rotating said bolt on its longitudinal axis through an angle that is sufficient to move said head to a position that will prevent said head from being withdrawn from said corner device through said slot.

9. A method for vibrating a steamship truck container having at least one rear corner device comprising a flat surface with a slot, in which method said container and a vibratory mechanism are connected to a clamp-type apparatus containing a rotatable fastening means comprising:

(a) a main plate having a first aperture, at least one second aperture, a first side, and a second side;

(b) a rotatable fastening means comprising a threaded nut and bolt assembly, the bolt of said assembly being threaded on one end and having an elongated expanded section at the other end, said section ending in a rectangular plate-type head, and said bolt passing through said first aperture so that said head is one the second side of said main plate and parallel to said second side of said main plate and the nut of said assembly is on the first side of said main plate, said head being suitable for insertion through said slot in said corner device of said container, said rotatable fastening means and said plate connecting said vibratory mechanism to said container;

(c) a means for rotating said bolt about its longitudinal axis, said means for rotating being joined to said bolt at its threaded end; and (d) a restraining means for preventing rotational movement of said apparatus relative to said container when said apparatus is connected to said container, said retraining means comprising a small plate which is perpendicular to said main plate, is joined to an edge of said main plate, and extends outwardly from said main plate toward the container to which said apparatus is connected;

which method comprises fastening said vibratory mechanism to said first said of said main plate by means of said at least one second aperture and fastening said container to said second side of said main plate by passing said head of said bolt through said slot in said corner device of said container and rotating said bolt on its longitudinal axis through an angle that is sufficient to move said head to a position that will prevent said head from being withdrawn from said corner device through said slot and causing said vibratory mechanism to vibrate.

10. A method for connecting a vibratory mechanism to a steamship truck container having at least one rear corner device comprising a flat surface with a slot, said connecting being accomplished by means of a clamp-type apparatus containing a rotatable fastening means comprising:

(a) a main plate having a first aperture, at least one second aperture, a first side, and a second side;

(b) a rotatable fastening means comprising a threaded nut and bolt assembly, the bolt of said assembly being threaded on one end and having an elongated expanded section at the other end, said section ending in a rectangular pate-type head, and said bolt passing through said first aperture so that said head is on the second side of said main plate and parallel to said second side of said main plate and the nut of said assembly is on the first side of said main plate, said head being suitable for insertion through said slot in said corner device of said container, said rotatable fastening means and said plate connecting said vibratory mechanism to said container;

(c) a means for rotating said bolt about its longitudinal axis, said means for rotating being joined to said bolt at its threaded end; and (d) a restraining means for preventing rotational movement of said apparatus relative to said container when said apparatus is connected to said container, said restraining means comprising a small plate which is perpendicular to said main plate, is joined to an edge of said main plate, and extends outwardly from said main plate toward the container to which said apparatus is connected;

(e) a wrench-type means for turning and tightening said nut on said bolt, said wrench-type means being joined to said nut;

which method comprises fastening said vibratory mechanism to said first side of said main plate by means of said at least one second aperture and fastening said container to said second side of said main plate by passing said head of said bolt through said slot in said corner device of said container and rotating said bolt on its longitudinal axis through an angle that is sufficient to move said head to a position that will prevent said head from being withdrawn from said corner device through said slot.

11. A method for vibrating a steamship truck container having at least one rear corner device comprising a flat surface with a slot, in which method said container and a vibratory mechanism are connected to a clamp-type apparatus containing a rotatable fastening means comprising:

(a) a main plate having a first aperture, at least one second aperture, a first side, and a second side;

(b) a rotatable fastening means comprising a threaded nut and bolt assembly, the bolt of said assembly being threaded on one end and having an elongated expanded section at the other end, said section ending in a rectangular plate-type head, and said bolt passing through said first aperture so that said head is on the second side of said main plate and parallel to said second side of said main plate and the nut of said assembly is on the first side of said main plate, and the nut of said assembly is on the first side of said main plate, said head being suitable for insertion through said slot in said corner device of said container, said rotatable fastening means and said plate connecting said vibratory mechanism to said container;

(c) a means for rotating said bolt about its longitudinal axis, said means for rotating being joined to said bolt at its threaded end; and (d) a restraining means for preventing rotational movement of said apparatus relative to said container when said apparatus is connected to said container, said restraining means comprising a small plate which is perpendicular to said main plate, is joined to an edge of said main plate, and extends outwardly from said main plate toward the container to which said apparatus is connected;

(e) a wrench-type means for turning and tightening said nut on said bolt, said wrench-type means being joined to said nut;

which method comprises fastening said vibratory mechanism to said first side of said main plate by means of said at least one second aperture and fastening said container to said second side of said main plate by passing said head of said bolt through said slot in said corner device of said container and rotating said bolt on its longitudinal axis through an angle that is sufficient to move said head to a position that will prevent said head from being withdrawn from said corner device through said slot.

* * * * *

UNITED STATES PATENT AND TRADEMARK OFFICE
CERTIFICATE OF CORRECTION

PATENT NO.  : 5,139,359
DATED       : August 18, 1992
INVENTOR(S) : Rakar, et al It is certified that error appears in the above-identified patent and that said Letters Patent is hereby corrected as shown below:

Column 7, line 13 "pate-type head" should read --plate-type head--.

Column 8, line 26, "main pate" should read -- main plate --.

Column 10, line 1, "said retraining maeans" should read --said restraining means--.

Signed and Sealed this

Fifth Day of October, 1993

Attest:

BRUCE LEHMAN

Attesting Officer

Commissioner of Patents and Trademarks